(No Model.)
G. KING.
SWINGING GATE.
No. 272,061. Patented Feb. 13, 1883.
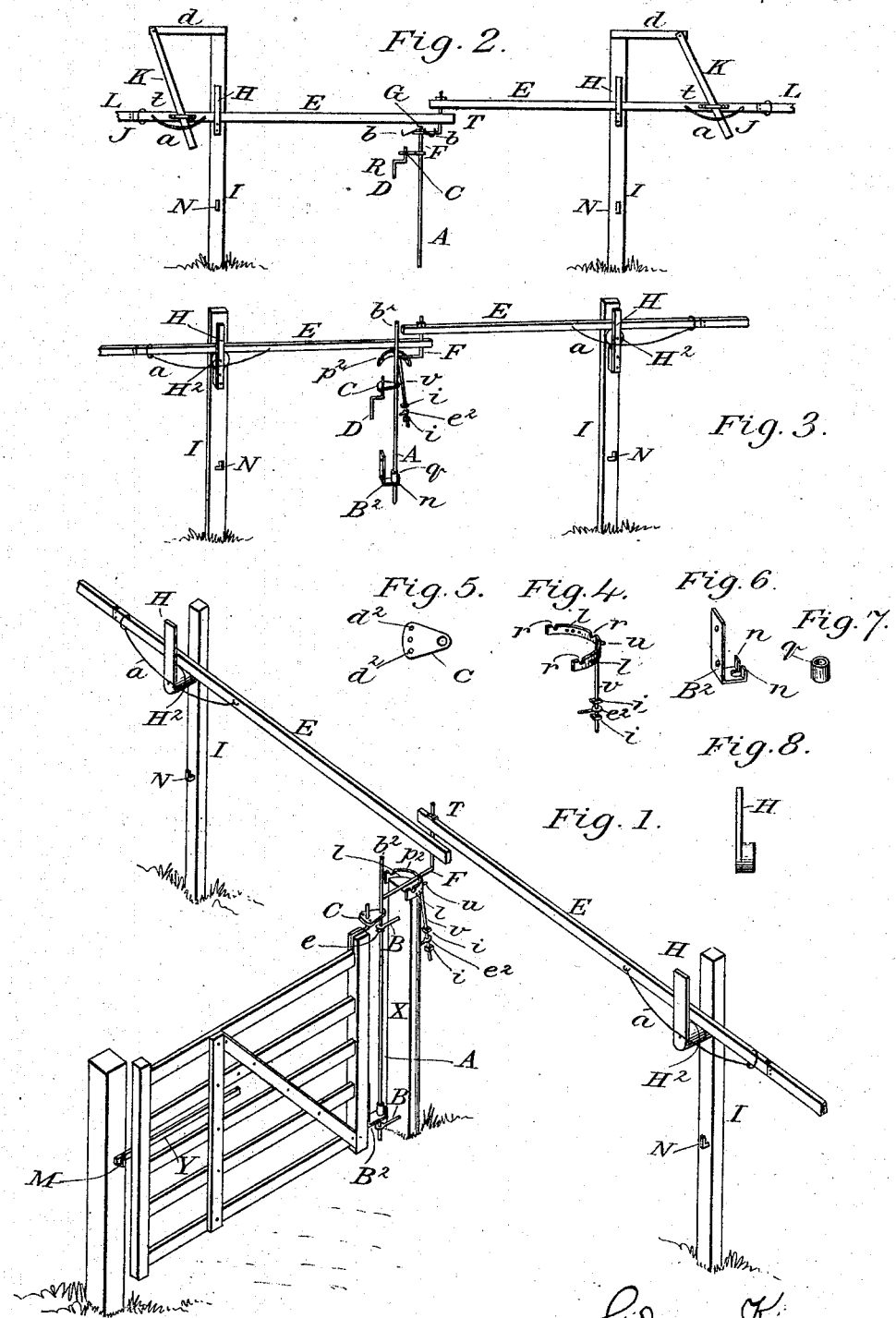
Witnesses:
W. P. McCorkle
G. E. Brown
Gideon King
Inventor.

UNITED STATES PATENT OFFICE.

GIDEON KING, OF EMINENCE, KENTUCKY.

SWINGING GATE.

SPECIFICATION forming part of Letters Patent No. 272,061, dated February 13, 1883.

Application filed September 4, 1882. (No model.)

*To all whom it may concern:*

Be it known that I, GIDEON KING, a citizen of the United States, residing at Eminence, in the county of Henry and State of Kentucky, have invented new and useful improvements amendatory and applicable to Gideon King's improvement in swinging gates, patented May 23, 1882, No. 258,306, of which the following is a specification.

This invention relates to an improvement in swinging gates so constructed that persons seated in vehicles can open and close the same without dismounting, and is an improvement on the said patent issued to the said Gideon King the day and date aforesaid; and it consists in a vertical secured to the hinge-rod, or in an extension of said rod through the arm of crank E, where it connects with the rod, and in a curved iron bar, with notches on the upper edge thereof, to which is attached a rod with adjustable screw and screw-taps, which is confined to the top of gate-post and operates under the crank.

The improvements are illustrated mechanically in the accompanying drawings, in which—

Figure 1 is a plain side view of the gate with all the improvements combined in working order. Fig. 2 is a plain side view of the original swinging-gate improvements patented to Gideon King, (the present applicant,) May 23, 1882, No. 258,306. Fig. 3 is a perspective view of the said invention, with friction-pulleys under the reciprocating levers, combined with the new improvements. Fig. 4 is an enlarged view of a curved iron bar, (substituted for curved rod P in the original patent, No. 258,306,) with rod and adjustable screw-tap. Fig. 5 is an enlarged plain view of arm C detached, with two additional holes. Fig. 6 is a perspective view of an angular forked hinge, with verticals used as the lower hinge. Fig. 7 is an enlarged view of sliding band which surrounds the hinge-rod and rests on the forked hinge.

A curved iron bar, $P^2$, Fig. 4, with oval notches $r\ r\ r$, is secured to and partly around the top of post X, Fig. 1, under crank F, by strong wrought-iron screws on each side of said post at $l\ l$. Said curved bar oscillates partially on these screws. The notches $r\ r$ at the end of the bar, (or $r$ at the middle,) each as desired, are moved up or down at pleasure in order to receive and hold the arm of the crank when its motion should cease, causing the gate to remain open or closed, as preferred, by means of rod $v$, hooked to the bar at $u$, Fig. 4. Rod $v$ extends downward in rear of post X, passing through screw-head $e^2$, (the screw being in the rear of the post,) and has adjustable screw-taps or nuts $i\ i$ on said rod, one above and one below the screw-head. By the use of said adjustable rod and screw-taps the notches are made to fit the crank-arm tight or loosely, as the weight of the gate may require. Vertical $b^2$, Fig. 3, is an extension of rod A, (or iron welded, or otherwise confined to said rod above arm C,) and extends above the angle forming the crank high enough to prevent the crank from reaching the dead-point, which is prevented by levers E E coming in contact with said vertical before that point is reached by the crank. It also prevents the cranks moving beyond the center or axis. One end of said levers operates on the crank-handle, the other end on friction-pulleys $H^2$ in slots H, fixed on or in posts I I. Arm C, Fig. 5, used in connection with hinge D, Fig. 1, is made wide enough to admit of an additional hole on each side of the original at $d^2$, Fig. 5, to be used when preferred. I use an angular forked hinge, Fig. 6, with verticals $n\ n$, which operate on lower hinge, B, Fig. 1, straddling rod A, around which a sliding band is placed. This band rests on hinge B, between rod A and verticals $n\ n$, preventing the hinge and rod from being separated by intrusion of stock or other forces. When the band is moved up the gate is easily moved or taken from the hangings or swinging fixtures.

The improvements thus combined, arranged, and applied to the said original patent, No. 258,306, issued to Gideon King, (the present applicant,) May 23, 1882, contribute to produce the desired result—viz., harmonious, easy, and prompt action of all the parts of the device in opening and closing gates by persons while seated in vehicles.

I am aware that prior to my invention friction-pulleys in various forms in mechanism have been used. I am also aware that forked hinges have been in use prior to my invention. I therefore do not claim either; but What I do claim as my invention, and desire to secure by Letters Patent, is—

1. The combination, with the hinge-rod of a gate, having a crank-arm at its top, of the hinge-post bearing a curved iron bar provided with notches to support said crank-arm, the operating levers attached to the same, and the vertical upward extension of the hinge-rod, as and for the purposes specified.

2. In combination with the gate-post X, the curved bar $P^2$, rod $v$, adjustable screw-taps $i$ $i$, and screw $e^2$, arranged, constructed, and operated substantially as shown and described.

GIDEON KING.

Witnesses:
W. P. McCORKLE,
J. N. HAYMAKER.